United States Patent
Snider

(10) Patent No.: US 10,272,833 B2
(45) Date of Patent: Apr. 30, 2019

(54) VEHICLE GLASS ROOF WITH LIGHT CONTROLS AND INTERIOR LIGHTS

(71) Applicant: MAGNA MIRRORS OF AMERICA, INC., Holland, MI (US)

(72) Inventor: Darin J. Snider, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 15/839,167

(22) Filed: Dec. 12, 2017

(65) Prior Publication Data

US 2018/0170251 A1     Jun. 21, 2018

Related U.S. Application Data

(60) Provisional application No. 62/435,996, filed on Dec. 19, 2016.

(51) Int. Cl.
| | |
|---|---|
| *B60J 7/00* | (2006.01) |
| *B60Q 3/51* | (2017.01) |
| *B60Q 3/54* | (2017.01) |
| *B60Q 3/208* | (2017.01) |
| *B60Q 3/76* | (2017.01) |
| *B60Q 3/85* | (2017.01) |
| *B60Q 3/88* | (2017.01) |
| *B62D 65/02* | (2006.01) |

(Continued)

(52) U.S. Cl.
CPC ............ *B60Q 3/208* (2017.02); *B60Q 3/51* (2017.02); *B60Q 3/54* (2017.02); *B60Q 3/74* (2017.02); *B60Q 3/76* (2017.02); *B60Q 3/85* (2017.02); *B60Q 3/88* (2017.02); *B62D 65/02* (2013.01); *B60Q 7/00* (2013.01); *B60Q 2500/10* (2013.01); *B62D 25/06* (2013.01)

(58) Field of Classification Search
CPC ....................................................... B60Q 3/02
USPC ................................. 362/490, 509, 516, 517
See application file for complete search history.

(56) References Cited

U.S. PATENT DOCUMENTS

| 4,488,141 A | 12/1984 | Ohlenforst et al. |
| 4,645,970 A | 2/1987 | Murphy |

(Continued)

FOREIGN PATENT DOCUMENTS

| DE | 9114246 U1 | 1/1992 |
| WO | 2012177995 A1 | 12/2012 |
| WO | 2014152563 A1 | 9/2014 |

OTHER PUBLICATIONS

Sanchez, Dan, "Lighting Up Cap and Tonneau Sales," Trucking Times.com, Wiesner Media 2015.

*Primary Examiner* — Allyson N Trail
(74) *Attorney, Agent, or Firm* — Honigman LLP

(57) ABSTRACT

A glass roof assembly for a vehicle includes a frame portion and a glass roof panel disposed at and at least partially circumscribed by the frame portion. When the glass roof assembly is installed at a vehicle, a forward region of the glass roof panel is at a headliner of the vehicle and above a windshield of the vehicle. The glass roof assembly includes a lighting device having at least one interior light source and a user input for actuating the light. The lighting device is attached as a unit at an in-cabin surface of the glass roof panel at the forward region of the glass roof panel. The lighting device is electrically connected to a power source of the vehicle via electrical connection at the headliner of the vehicle when the glass roof assembly is installed at the vehicle.

20 Claims, 11 Drawing Sheets

(51) Int. Cl.
*B60Q 3/74* (2017.01)
*B62D 25/06* (2006.01)
*B60Q 7/00* (2006.01)

(56) References Cited

U.S. PATENT DOCUMENTS

| | | | |
|---|---|---|---|
| 4,758,931 A | 7/1988 | Gabaldon | |
| 4,896,136 A | 1/1990 | Hotovy | |
| 4,920,698 A | 5/1990 | Friese et al. | |
| 4,995,195 A | 2/1991 | Olberding et al. | |
| 5,016,145 A | 5/1991 | Singleton | |
| 5,050,051 A | 9/1991 | Machida et al. | |
| 5,146,712 A | 9/1992 | Hlavaty | |
| 5,211,466 A | 5/1993 | Jarocki et al. | |
| 5,400,225 A | 3/1995 | Currie | |
| 5,531,046 A | 7/1996 | Kollar et al. | |
| 5,551,197 A | 9/1996 | Repp et al. | |
| 5,572,376 A | 11/1996 | Pace | |
| 5,799,444 A | 9/1998 | Freimark et al. | |
| 5,831,523 A | 11/1998 | Lange | |
| 5,839,231 A | 11/1998 | Gebhart et al. | |
| 5,853,895 A | 12/1998 | Lewno | |
| 5,996,284 A | 12/1999 | Freimark et al. | |
| 6,026,611 A | 2/2000 | Ralston et al. | |
| 6,068,719 A | 5/2000 | Lewno | |
| 6,086,230 A | 7/2000 | Wooldridge et al. | |
| 6,119,401 A | 9/2000 | Lin et al. | |
| 6,319,344 B1 | 11/2001 | Lewno | |
| 6,536,930 B1 | 3/2003 | Hirmer | |
| 6,691,464 B2 | 2/2004 | Nestell et al. | |
| 6,846,039 B2 | 1/2005 | Lewno | |
| 6,955,009 B2 | 10/2005 | Rasmussen | |
| 7,003,916 B2 | 2/2006 | Nestell et al. | |
| 7,036,965 B2 | 5/2006 | Dalton, Jr. et al. | |
| 7,048,400 B2 | 5/2006 | Murasko et al. | |
| 7,073,293 B2 | 7/2006 | Galer | |
| 7,172,322 B2 | 2/2007 | Pommeret et al. | |
| 7,332,225 B2 | 2/2008 | Lewno | |
| 7,347,608 B2 | 3/2008 | Emde | |
| 7,575,349 B2 | 8/2009 | Bucher et al. | |
| 7,642,908 B2 | 1/2010 | Mertens | |
| 7,838,115 B2 | 11/2010 | Lewno | |
| 8,047,691 B2 | 11/2011 | Leese et al. | |
| 8,151,519 B2 | 4/2012 | Bello et al. | |
| 8,322,073 B2 | 12/2012 | Lewno | |
| 8,382,350 B2 | 2/2013 | Gold | |
| 8,402,695 B2 | 3/2013 | Smith et al. | |
| 8,408,773 B2 | 4/2013 | Judge | |
| 8,827,347 B2 | 9/2014 | Snider | |
| 8,881,458 B2 | 11/2014 | Snider et al. | |
| 8,882,318 B2 | 11/2014 | Pfeil et al. | |
| 8,915,018 B2 | 12/2014 | Snider | |
| 8,938,914 B2 | 1/2015 | Hulst et al. | |
| 9,539,883 B2 | 1/2017 | Snider et al. | |
| 2002/0152686 A1 | 10/2002 | Whitehead | |
| 2003/0213179 A1 | 11/2003 | Galer | |
| 2004/0020131 A1 | 2/2004 | Galer et al. | |
| 2005/0046241 A1* | 3/2005 | Sasaki | B60J 7/003 296/216.01 |
| 2006/0082192 A1 | 4/2006 | Dubay et al. | |
| 2006/0092658 A1 | 5/2006 | Scholz | |
| 2006/0107600 A1 | 5/2006 | Nestell et al. | |
| 2007/0217213 A1 | 9/2007 | Chang | |
| 2008/0106124 A1 | 5/2008 | Snider | |
| 2008/0127563 A1 | 6/2008 | Tooker | |
| 2008/0155902 A1 | 7/2008 | Kaiser | |
| 2009/0073708 A1* | 3/2009 | Kino | B60Q 3/74 362/490 |
| 2010/0149826 A1 | 6/2010 | Leese et al. | |
| 2011/0056140 A1 | 3/2011 | Lewno | |
| 2012/0003571 A1* | 1/2012 | Devoe | H01M 8/0202 429/535 |
| 2013/0174488 A1 | 7/2013 | Snider et al. | |
| 2013/0229815 A1* | 9/2013 | Pfeil | G02B 6/001 362/493 |
| 2013/0255156 A1 | 10/2013 | Snider | |
| 2014/0047772 A1 | 2/2014 | Hulst | |
| 2015/0314672 A1 | 11/2015 | Lahnala | |
| 2015/0353005 A1* | 12/2015 | Hodgson | G06F 3/016 345/156 |
| 2016/0059680 A1 | 3/2016 | Snider et al. | |
| 2016/0075595 A1* | 3/2016 | Jang | C04B 35/10 428/427 |
| 2016/0200241 A1 | 7/2016 | Snider | |
| 2016/0266782 A1* | 9/2016 | Rawlinson | G06F 3/02 |
| 2017/0232824 A1* | 8/2017 | Salter | B60J 1/20 362/509 |
| 2018/0147981 A1* | 5/2018 | Troeger | B60Q 3/59 |

* cited by examiner

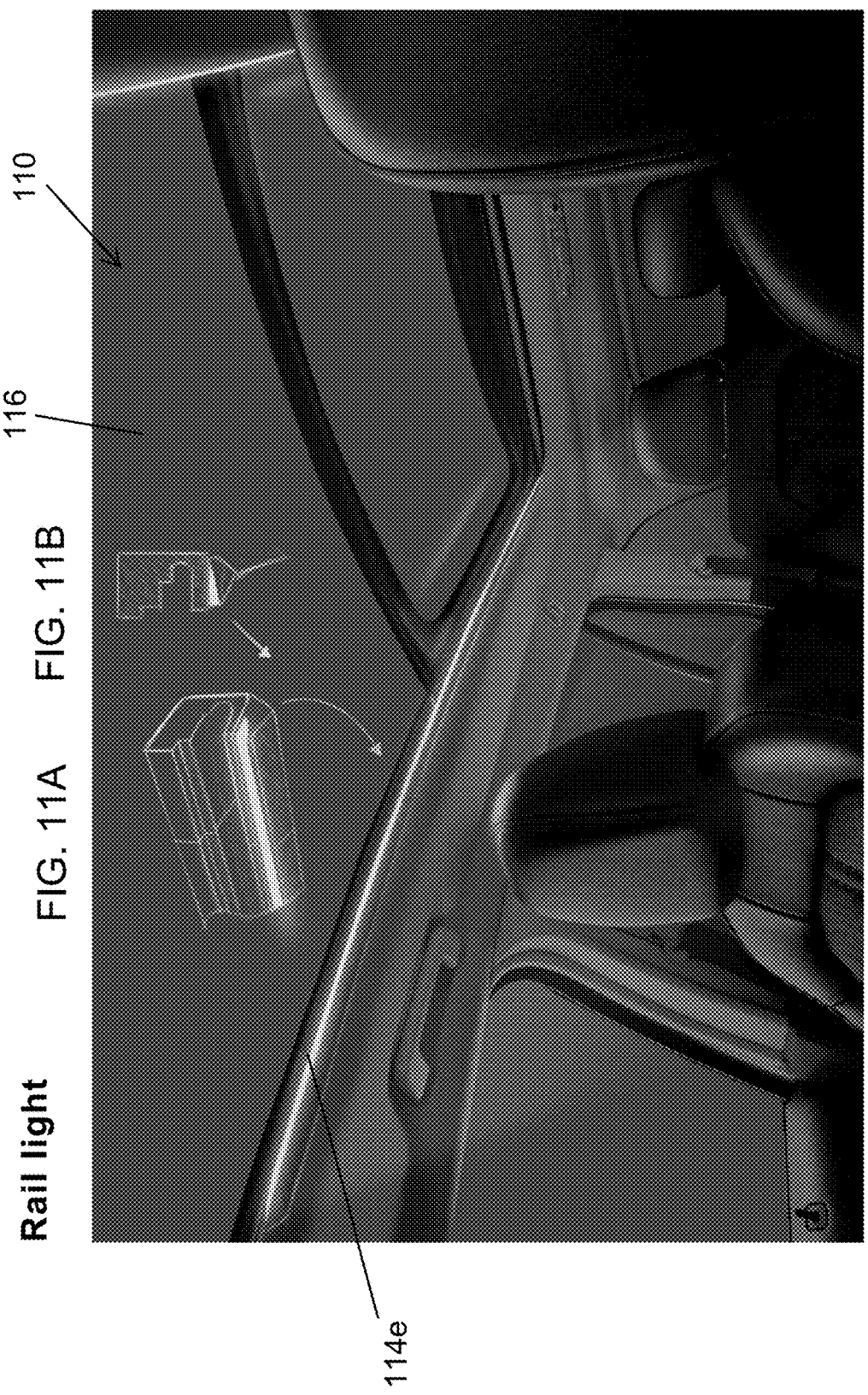

VEHICLE GLASS ROOF WITH LIGHT CONTROLS AND INTERIOR LIGHTS

CROSS REFERENCE TO RELATED APPLICATION

The present application claims the filing benefits of U.S. provisional application Ser. No. 62/435,996, filed Dec. 19, 2016, which is hereby incorporated herein by reference in its entirety.

FIELD OF THE INVENTION

The present invention relates to roof assemblies for vehicles and, more particularly, to glass roof assemblies for vehicles.

BACKGROUND OF THE INVENTION

It is known to provide glass roof assembly for a vehicle and it is also known to provide a glass sunroof that is openable and closable at an opening in a roof of a vehicle. Interior lighting may be provided in the vehicle, such as at a header portion of the vehicle or a header console of the vehicle.

SUMMARY OF THE INVENTION

The present invention provides a glass roof of a vehicle that has interior lighting (such as a task light or map reading light and/or a courtesy light) and controls for the interior lighting disposed at the glass surface of the glass roof panel, such as at or near a header portion of the vehicle at the upper region of the windshield. The lighting device (comprising the interior lights and user inputs or controls associated with the interior lights) is disposed at the in-cabin surface of the glass roof panel such that the glass roof assembly (with lighting device) is installed in the vehicle as a unit or module.

These and other objects, advantages, purposes and features of the present invention will become apparent upon review of the following specification in conjunction with the drawings.

BRIEF DESCRIPTION OF THE DRAWINGS

FIG. 10A is a partial perspective view of the side rail light of FIG. 10;

FIG. 10B is a sectional view of the side rail light of FIG. 10A, shown with the inner vehicle trim at and below the side rail light;

FIG. 11 is a perspective view of another glass roof assembly similar to FIG. 10, shown with an optional rail light configuration;

FIG. 11A is a partial perspective view of the side rail light of FIG. 11; and

FIG. 11B is a sectional view of the side rail light of FIG. 11A.

DESCRIPTION OF THE PREFERRED EMBODIMENTS

Figure 1:
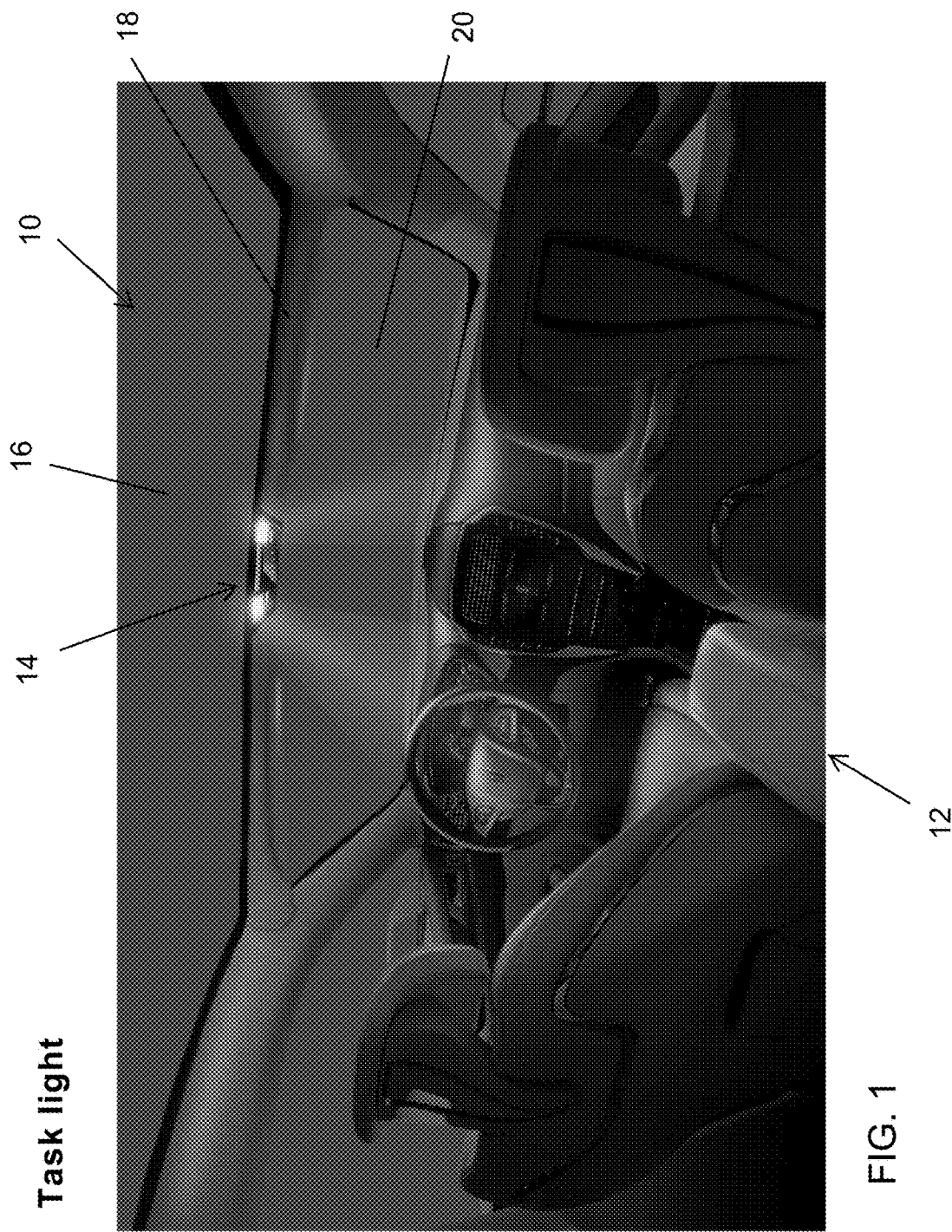
FIG. 1 is a perspective view of a vehicle having a glass roof assembly with lighting and controls in accordance with the present invention, shown with the task lights activated.
Figure 2:
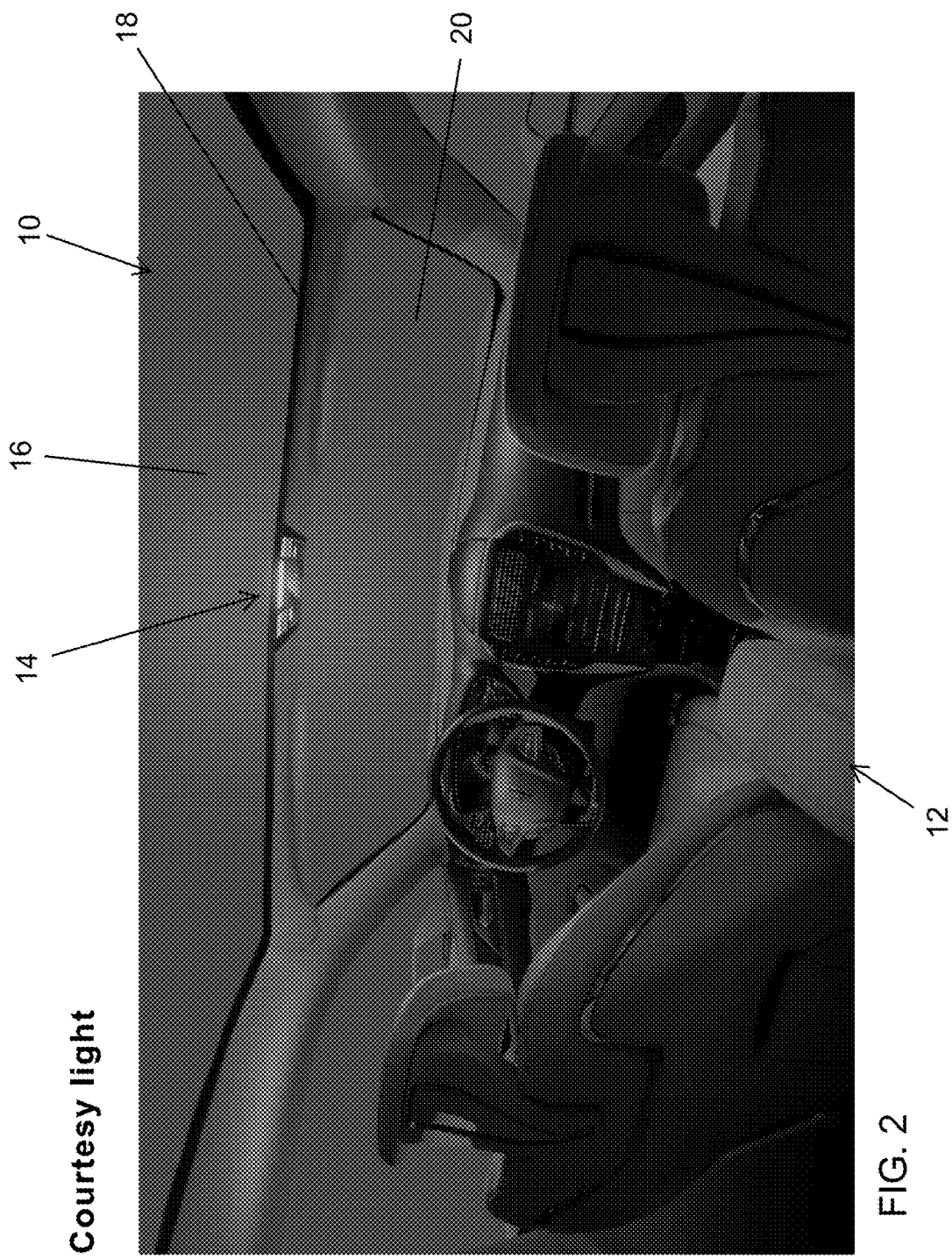
FIG. 2 is another perspective view of the glass roof assembly of FIG. 1, shown with the courtesy light activated.
Figure 3:
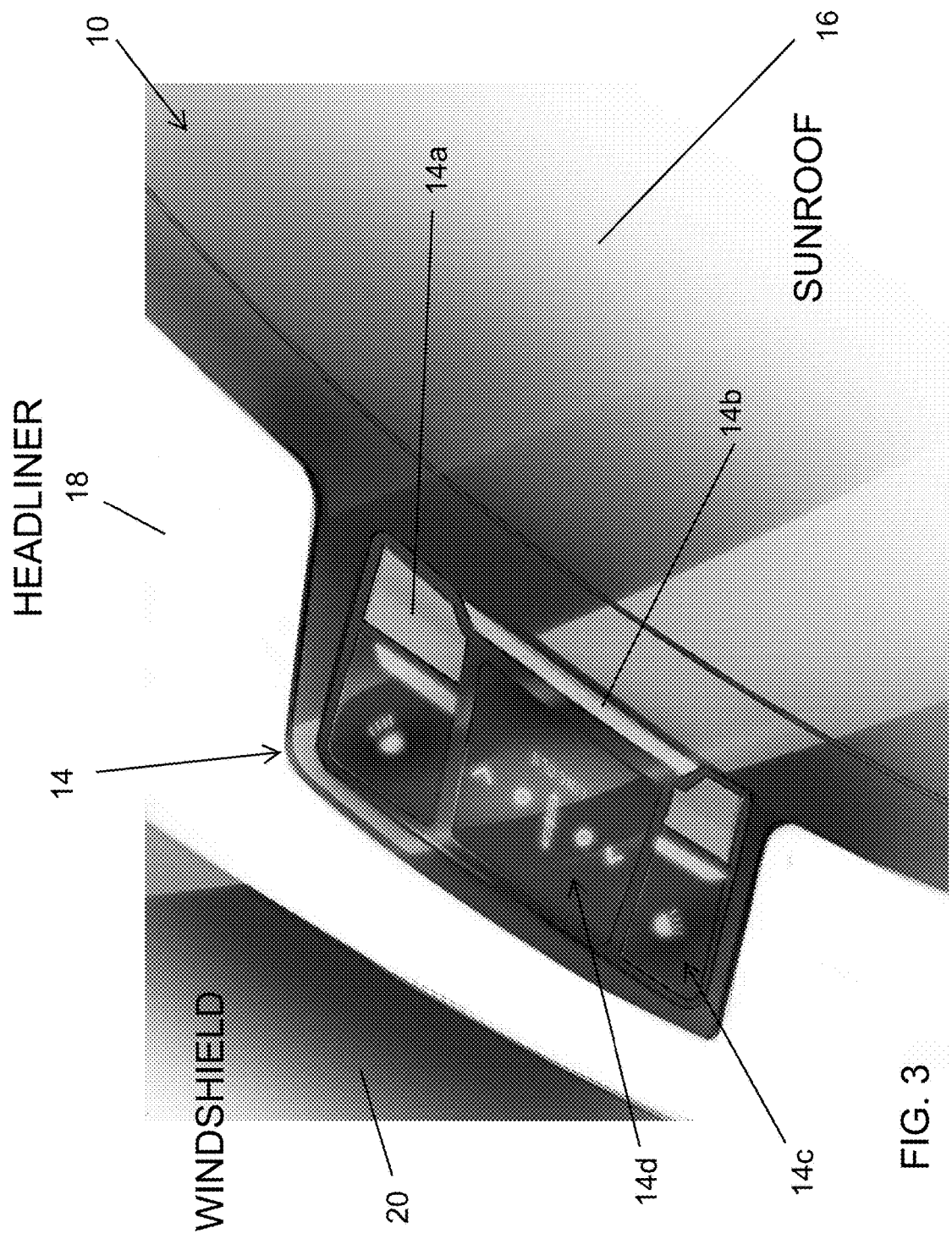
FIG. 3 is an enlarged perspective view of the lighting and control device of the glass roof assembly of FIGS. 1 and 2.

Referring now to the drawings and the illustrative embodiments depicted therein, a glass roof or window assembly 10 of a vehicle 12 (FIG. 1) includes a lighting device 14 disposed at an interior glass surface of the glass roof panel 16. The glass roof assembly 10 includes at least one glass panel that is disposed at the roof of the vehicle, with its forward region disposed at a header or headliner 18 of the vehicle (that is disposed at and along the upper region of the windshield 20 of the vehicle). The lighting device is established (such as via adhesively bonding or otherwise securing) directly at the glass surface of the glass roof panel 16, such as at a recessed area of the headliner 18, such as shown in FIG. 3. The roof assembly 10 thus includes the interior lights and controls for the lights, such that the roof panel and interior lighting feature may be provided together as a unit, with electrical power being provided to the lighting device 14 via a power connection at the headliner that electrically connects the lighting device to a vehicle power source (optionally, it is envisioned that the lighting device 14 may be battery operated (via a battery of the lighting device) such that no electrical connection to the vehicle is needed).

As shown in FIG. 3, the lighting device 14 includes task lights 14a (such as map reading lights or the like that direct light to designated or selected areas at or near the driver and/or passenger side of the vehicle cabin) and a courtesy light 14b (that generally illuminates the cabin of the vehicle), with the controls 14c for activating/deactivating the lights 14a, 14b being disposed at the device 14, such as at or near the respective light or lights. The controls may comprise any suitable user input, such as buttons or switches or touch or proximity sensors or the like, such that the user may actuate a selected light by touching an area of the lighting device at or near the desired light (or the light sources may be actuated via audible voice commands or gesture recognition system or the like).

In the illustrated embodiment, the lighting device 14 is disposed at a recessed area of the headliner 18. The lighting device may comprise a module or unit that is attached at the interior surface of the glass panel 16, such as via an adhesive or the like, and may be attached at a non-light transmitting portion of the glass panel, such as where a ceramic frit layer or other opaque or non-light-transmitting coating or layer is provided. When the lighting device is attached at the interior surface of the glass panel (either directly at the glass surface or at a frit layer or the like at the interior surface), electrical connection may be made to electrical contacts (such as electrically conductive traces) at the glass surface, which, when the glass roof assembly is installed at the vehicle, are electrically connected to electrical connectors for electrically connecting the device to a wire harness or the like at the headliner.

Optionally, the glass roof assembly 10 may comprise a movable glass window panel that is movable relative to a fixed roof or glass panel of the vehicle between an opened position (where the movable panel is moved at least partially away from an aperture formed or established through the fixed glass roof panel or the vehicle roof) and a closed position (where the movable panel is moved to be generally within the aperture with its outer surface generally flush with the outer surface of the fixed glass panel or vehicle roof). The lighting device 14 may also include sunroof controls 14d to open and close the movable panel. The movable panel controls and motor for moving the movable panel thus may all be part of the roof assembly, so the roof assembly may be mounted to the vehicle as a modular unit.

As can be seen with reference to FIG. 3, the lighting device 14 comprises a low profile unit or module that includes the light sources and controls, such that the lighting device is fully operation when the window assembly is installed in the vehicle and when the lighting source is electrically connected to a power source (such as to the power source of the vehicle). The controls or user inputs may comprise touch sensors disposed at or behind icons established at touch surfaces or elements of the lighting device. The light sources may comprise light emitting diodes (LEDs) disposed behind transparent (or optionally tinted or colored) cover elements or lenses that direct the light emitted by the LED(s) in the desired or selected manner. The user inputs and LEDs may be disposed at one or more printed circuit boards of the lighting device, with the lighting device including a cover or housing that substantially or at least partially encases the printed circuit board when the lighting device is attached at the in-cabin surface of the glass roof panel.

Figure 4:
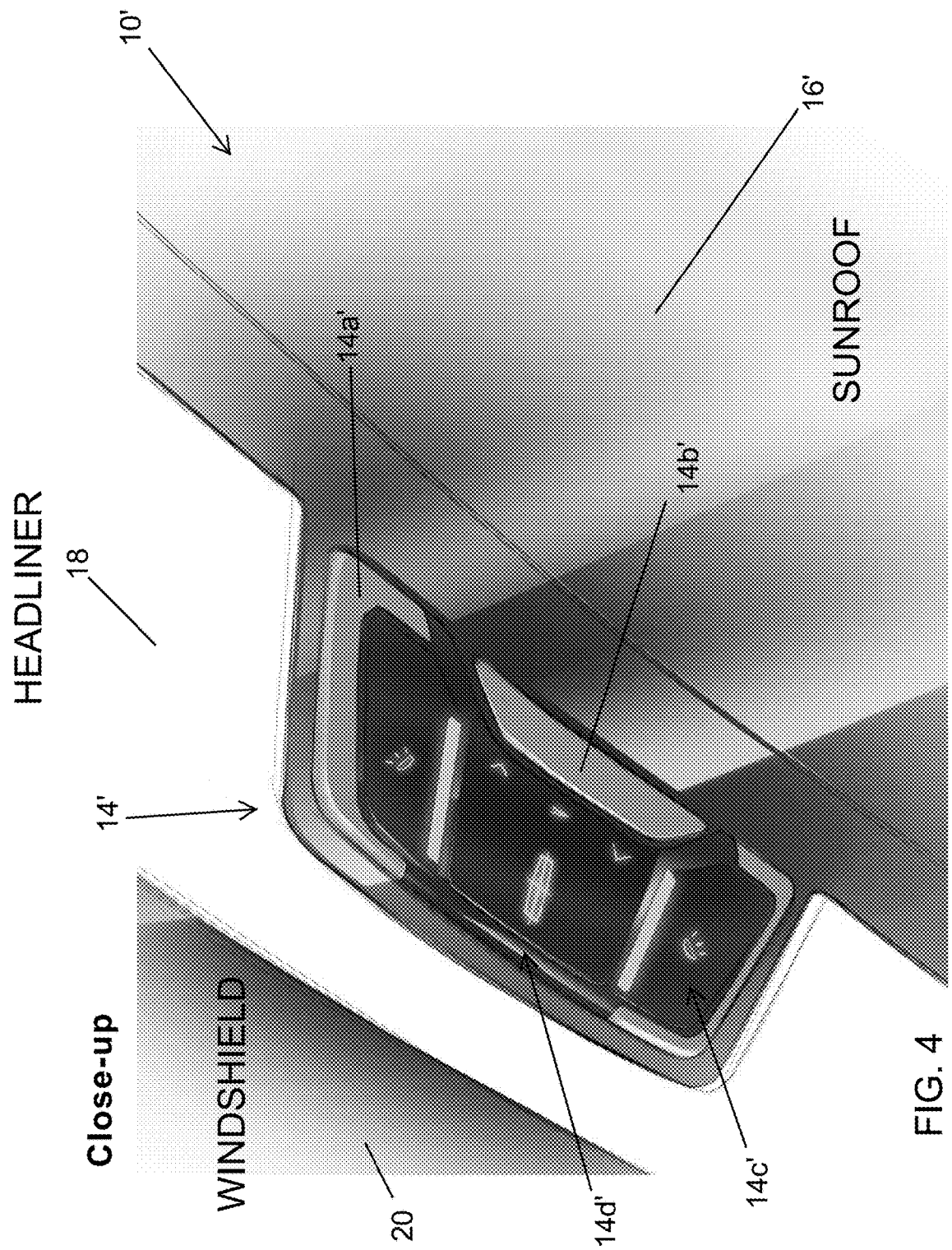
FIG. 4 is an enlarged perspective view of another lighting and control device of a glass roof assembly of the present invention.
Figure 5:
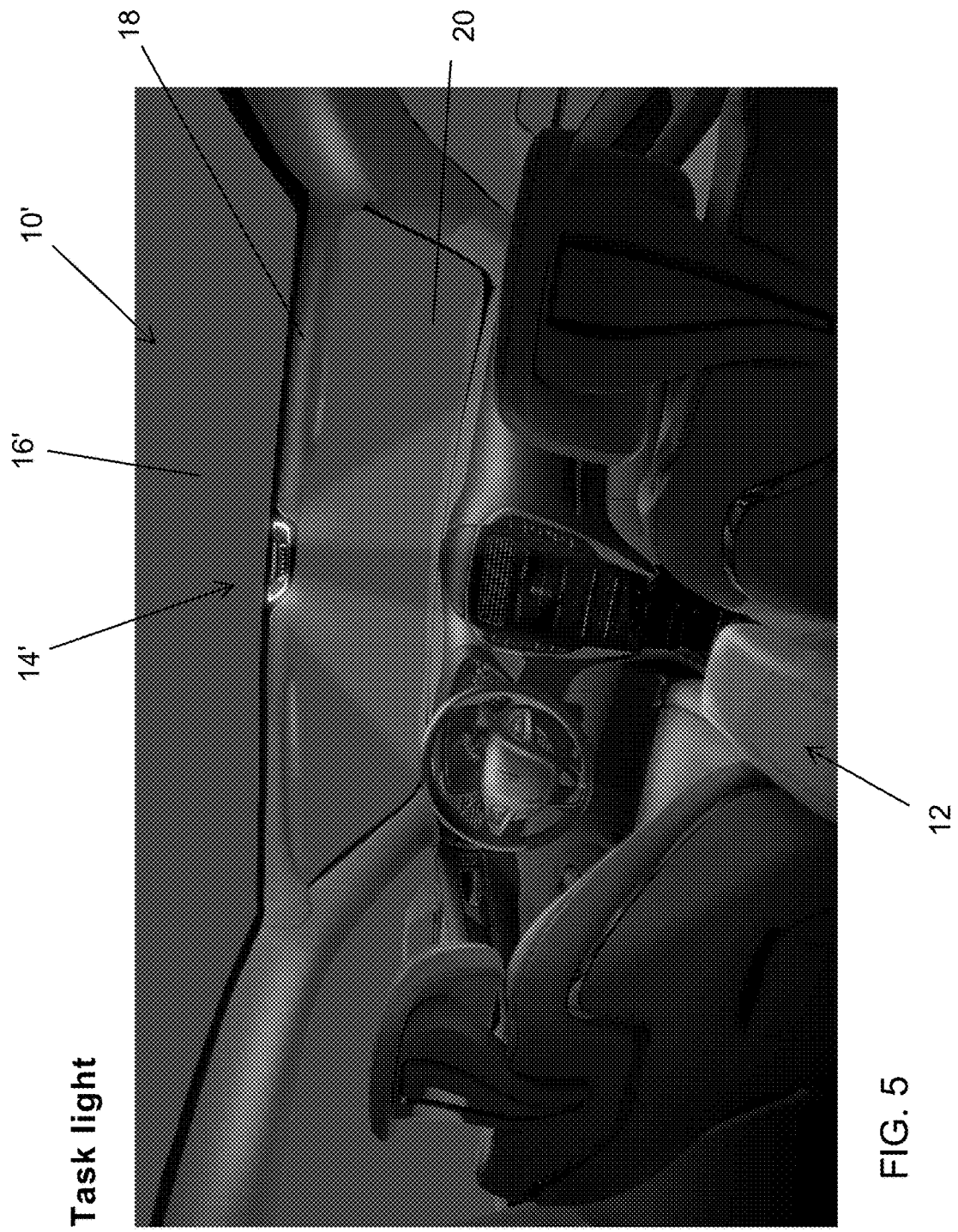
FIG. 5 is a perspective view of the glass roof assembly of FIG. 4, shown with the task lights activated.
Figure 6:
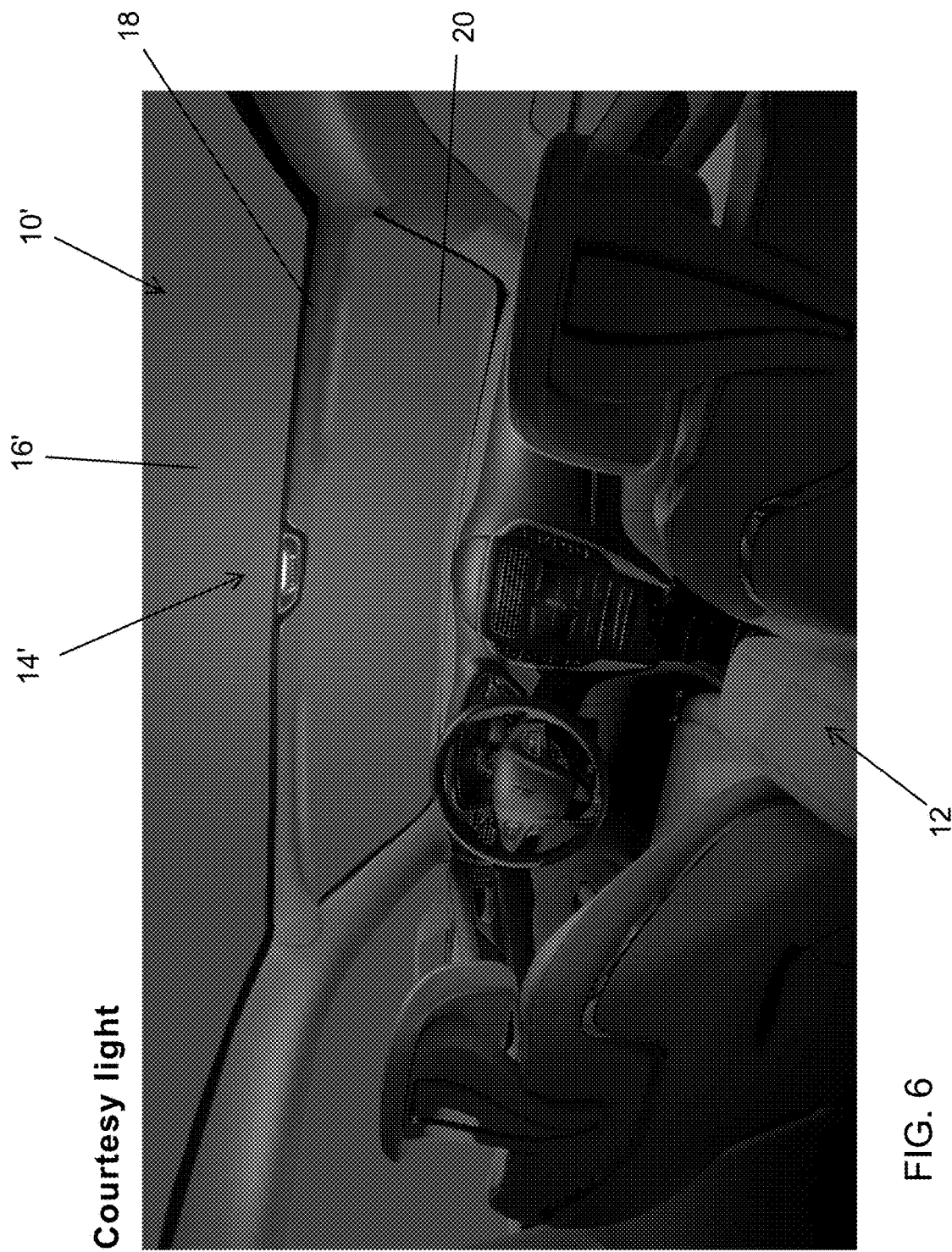
FIG. 6 is another perspective view of the glass roof assembly of FIG. 5, shown with the courtesy light activated.
Figure 7:
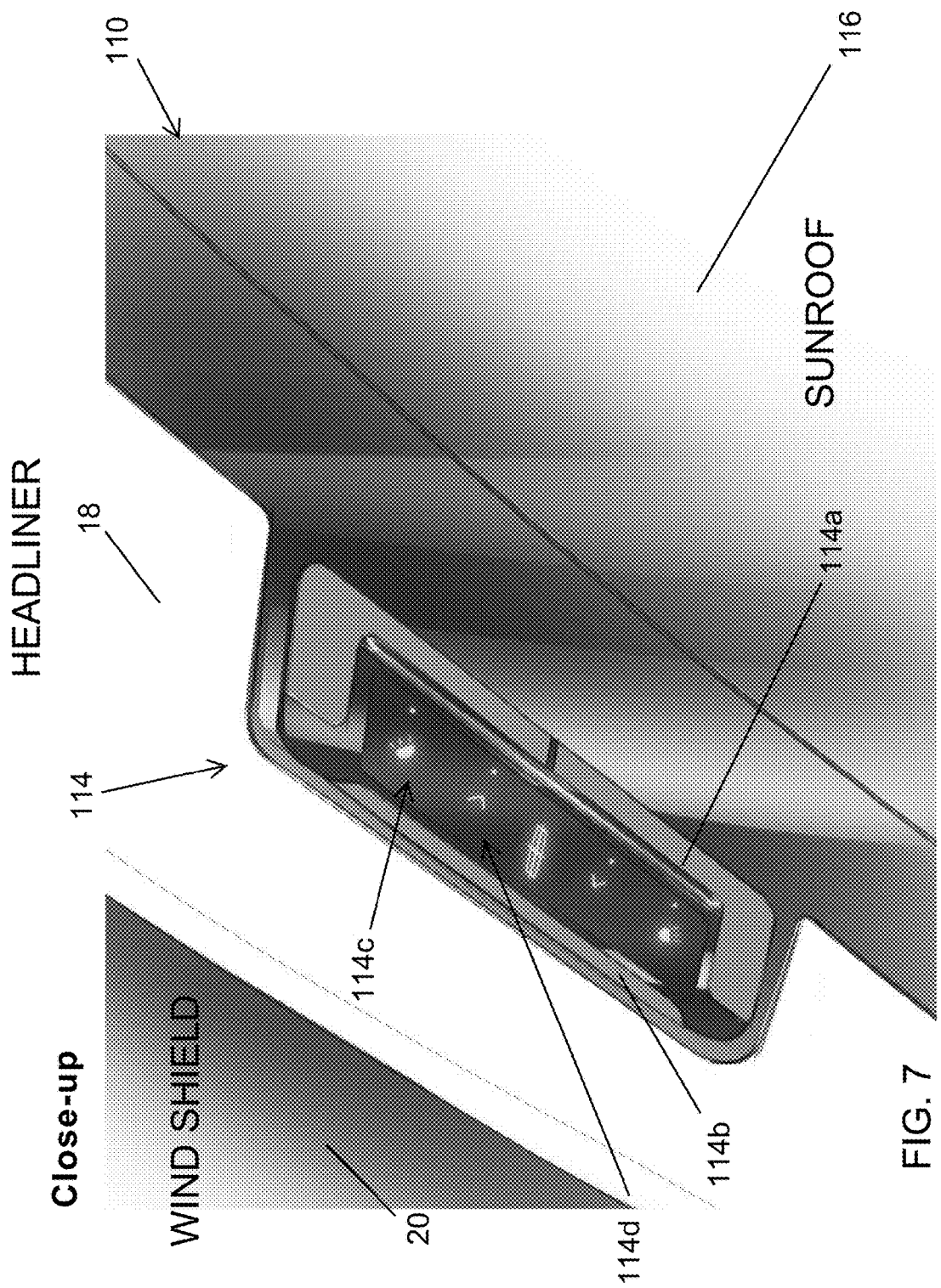
FIG. 7 is an enlarged perspective view of another lighting and control device of a glass roof assembly of the present invention.
Figure 8:
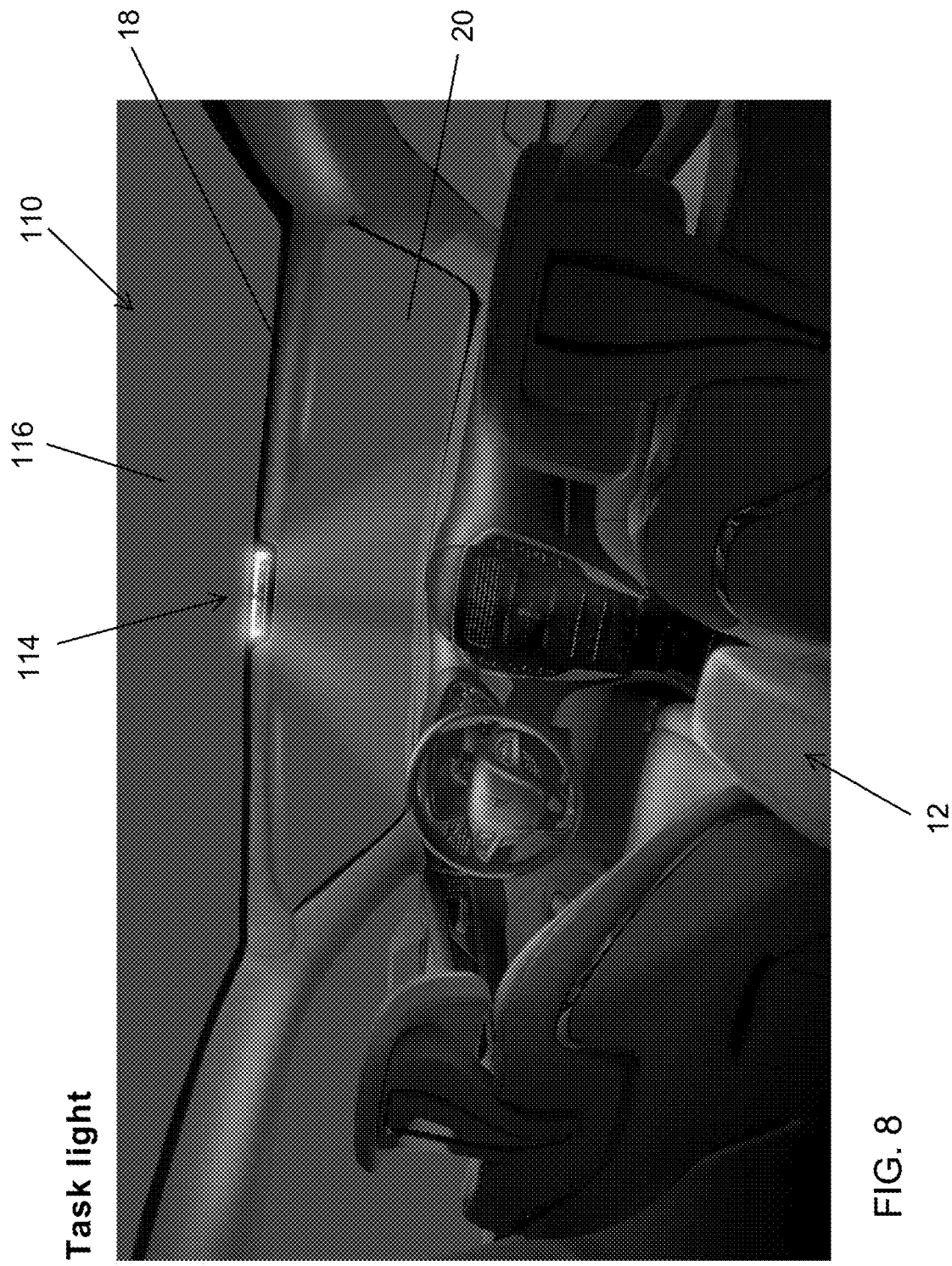
FIG. 8 is a perspective view of the glass roof assembly of FIG. 7, shown with the task lights activated.
Figure 9:
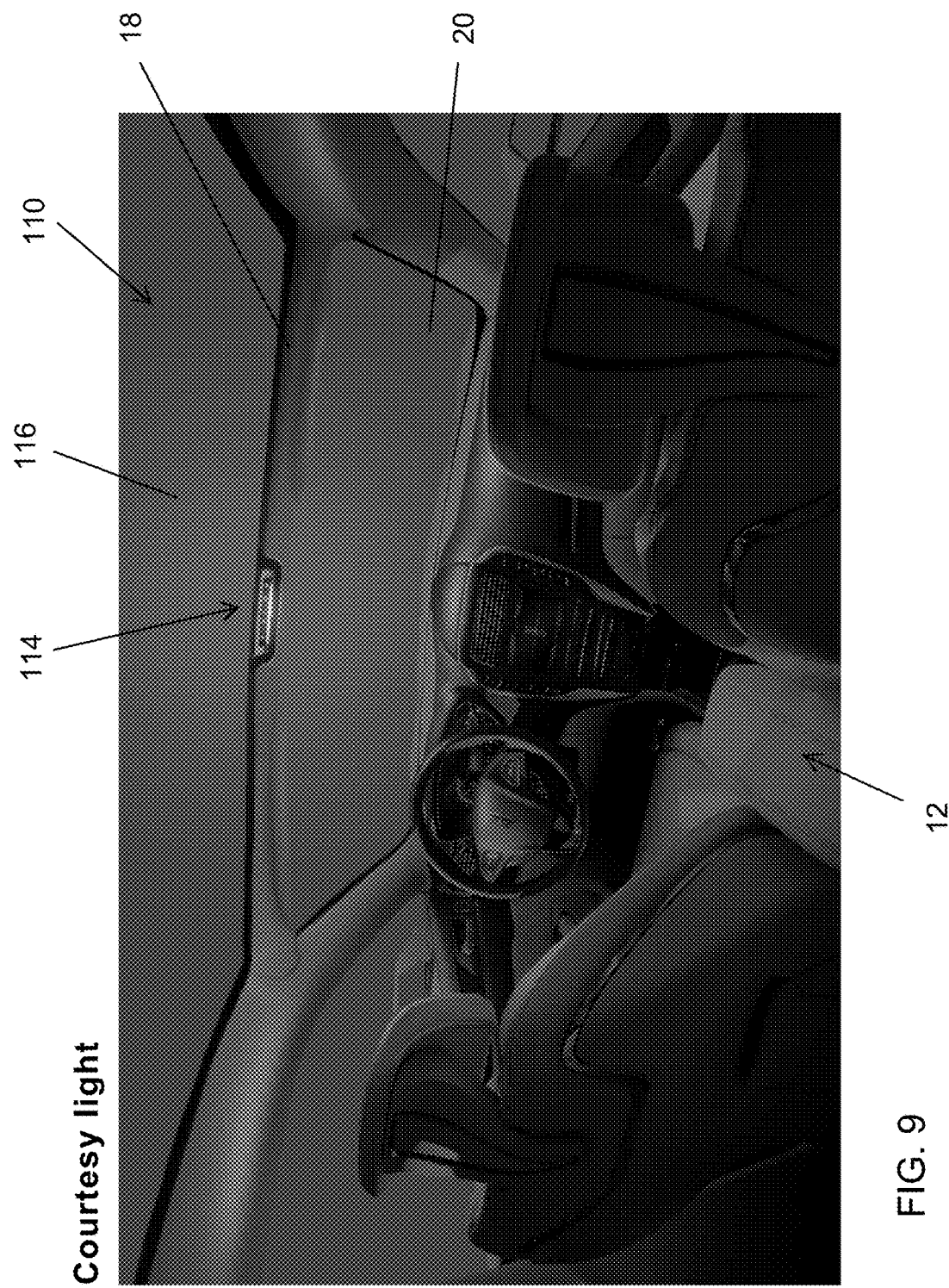
FIG. 9 is another perspective view of the glass roof assembly of FIG. 8, shown with the courtesy light activated.
Figure 10:
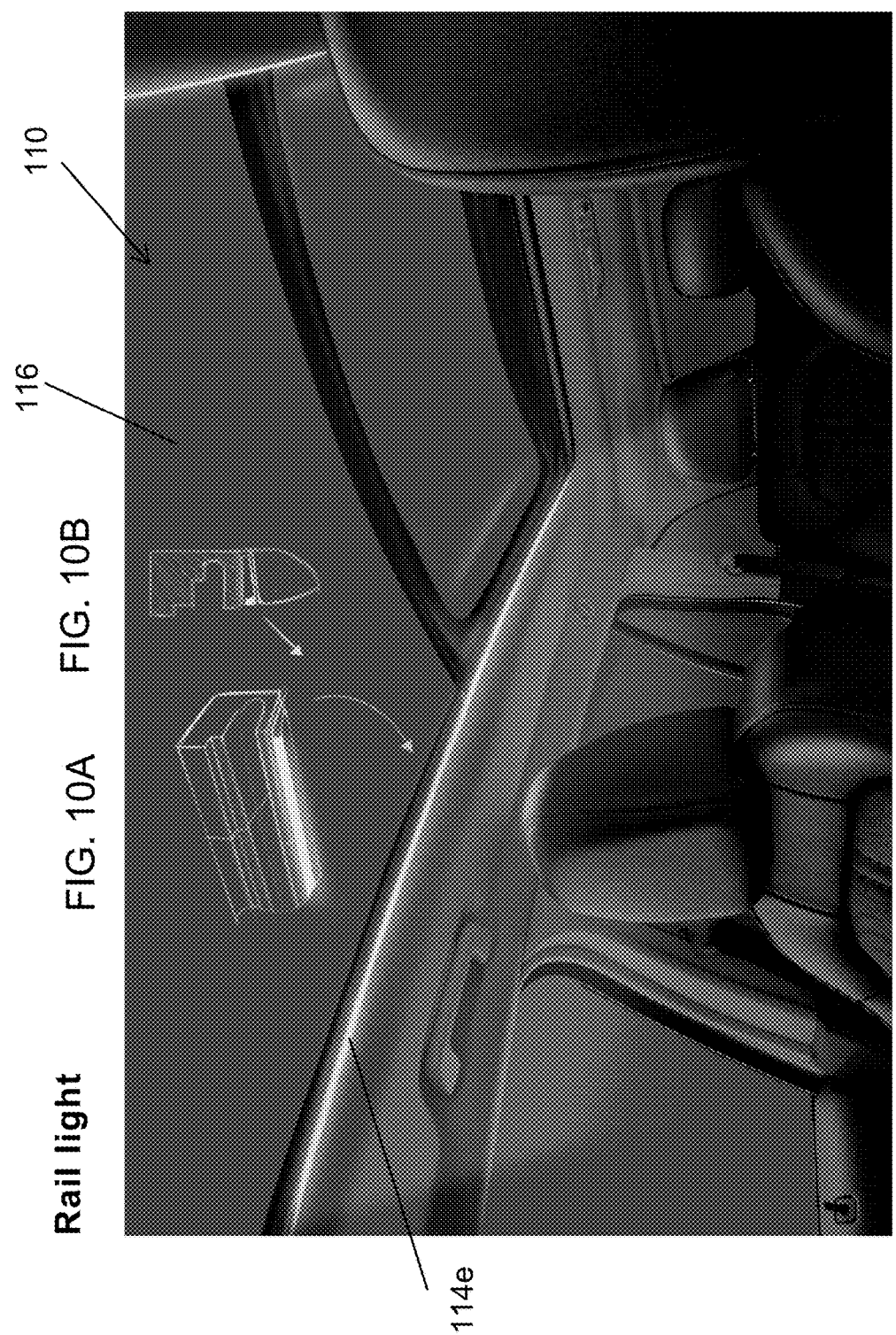
FIG. 10 is another perspective view of the glass roof assembly of FIG. 8, shown with a side rail light activated.

In the illustrated embodiment of FIG. 3, the task lights 14a and courtesy light 14b of the lighting device 14 are arranged to provide the desired lighting effect when they are actuated. Optionally, and as shown in FIGS. 4-6, a lighting device 14' is disposed at a glass roof panel 16' of a glass roof assembly 10' and includes a different arrangement of light sources 14a', 14b' and user inputs 14c', 14d' to provide the desired or selected lighting effect. Optionally, and such as shown in FIGS. 7-9, a lighting device 114 is disposed at a glass roof panel 116 of a glass roof assembly 110 and includes a different arrangement of light sources 114a, 114b and user inputs 114c, 114d to provide the desired or selected lighting effect.

Optionally, and such as shown in FIGS. 10, 10A, 10B, 11, 11A and 11B, the glass roof assembly 110 (or the assembly 10 or 10') may include side interior lighting 114e, such as light pipes or LED strips or the like, disposed along the side rails to provide illumination along and within the interior cabin of the vehicle. The side lights 114e may be disposed along the side rails of a frame of the glass roof assembly and operable via user inputs at the lighting device 114. The controls or user inputs of the lighting device 114 may be electrically connected to the side lights 114e via any suitable electrical connection, such as via conductive traces disposed at the in-cabin surface of the fixed window panel (and disposed along the perimeter edge region of the panel and electrically isolated or encapsulated and hidden at the headliner or at a perimeter region where the opaque frit layer is established. Optionally, the side lights may be disposed at the vehicle and along the interior trim of the vehicle, whereby electrical connection between the controls of the lighting device 114 and the side lights may be provided via electrical wires or the like disposed at or in the headliner of the vehicle. Optionally, and such as can be seen with reference to FIGS. 10 and 11, the side lights may be established at or in or along the side rails in a manner to provide the desired or selected lighting effect within the vehicle cabin. Optionally, the lighting device 114 may include other controls or user inputs for controlling one or more other accessories of the vehicle, with the other controls or user inputs being electrically connected to the accessory or accessories when the roof assembly is installed at the vehicle (such as via electrical connection to a wire harness of the vehicle or to a vehicle network or communication bus or the like or via wireless communication).

Therefore, the present invention provides a glass roof assembly that includes a self-contained lighting device or module threat to provide cabin illumination via light sources of the lighting device when the glass roof assembly is installed at a vehicle. The lighting device is disposed at or attached at the in-cabin surface of the glass roof panel, such as at or near the headliner of the vehicle at the upper region of the vehicle windshield, and such as at a recessed region of the headliner. Electrical connection to the lighting device may be made at the headliner, such as via a vehicle wiring harness or the like. The glass roof assembly (including the glass roof panel(s) and frame and lighting device) thus may be installed at a vehicle as a unit, such that all lights and controls are part of the glass roof assembly. Optionally, the glass roof assembly may comprise a sunroof with a movable panel that is openable and closable at a fixed panel of the roof assembly, and with the user inputs for a sunroof motor or mechanism being at the lighting device of the roof assembly and with the sunroof motor/mechanism optionally also being part of the roof assembly (such that the roof assembly is installed at the vehicle and electrical power is provided at installation to power the lighting device and controls and sunroof motor/mechanism).

The glass roof may utilize aspects of the glass roof described in U.S. Publication Nos. 2008-0106124 and/or US-2016-0059680, which are hereby incorporated herein by reference in their entireties. The window assembly channels and guides and the like may utilize aspects of rear slider window assemblies, such as those described in U.S. Pat. No. 8,402,695 and/or U.S. Publication No. 2013-0174488, which are hereby incorporated herein by reference in their entireties. Optionally, the window assembly or assemblies of the present invention may utilize aspects of the window assemblies described in U.S. Pat. Nos. 8,402,695; 8,322,073; 7,838,115; 7,332,225; 7,073,293; 7,003,916; 6,846,039; 6,691,464; 6,319,344; 6,068,719 and/or 5,853,895, and/or U.S. Publication Nos. 2014-0047772; 2013-0255156; 2013-0174488; 2011-0056140; 2008-0127563; 2006-0107600; 2004-0020131 and/or 2003-0213179, which are hereby incorporated herein by reference in their entireties. Optionally, the window panel may include one or more electrically conductive elements, such as heater grids or a transparent conductive coating or the like, which may be powered utilizing aspects of the window assemblies described in U.S. Pat. No. 8,402,695 and/or U.S. Publication No. 2013-0174488, which are hereby incorporated herein by reference in their entireties. The roof and movable panel may comprise any suitable material, such as transparent glass or polycarbonate or the like.

Optionally, the channels or rails and the guide elements and/or perimeter carrier may be adhesively attached to the glass panel(s), respectively, such as by utilizing aspects of the window assemblies described in U.S. Pat. Nos. 5,551, 197 and 5,853,895, which are hereby incorporated herein by reference in their entireties. For example, the rails may be bonded to the fixed glass roof panel using any suitable adhesive, such as a one component urethane adhesive, such as a moisture cured adhesive, such as BETASEAL™ or the like, while the frame portion may be bonded to the movable panel, such as a glass window panel or polycarbonate window panel or the like, via any suitable adhesive, such as a moisture cured adhesive, such as BETASEAL™ or the like.

Optionally, the roof assembly may include a shade device or element. For example, the sunroof or movable panel may incorporate a shade element utilizing aspects of the window assemblies described in International Publication Nos. WO 2014/152563; WO 2014/011395; WO 2012/177995 and/or WO 2011/133830, and/or U.S. Publication Nos. 2008-0106124 and/or 2006-0082192, which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A glass roof assembly for a vehicle, said glass roof assembly comprising:
   a frame portion;
   a glass roof panel disposed at and at least partially circumscribed by said frame portion;
   a lighting device comprising at least one interior light source and at least one user input for actuating the at least one interior light source;
   wherein said lighting device is attached as a unit at an in-cabin surface of said glass roof panel at a forward region of said glass roof panel;
   wherein said glass roof assembly is configured so that, when said glass roof assembly, which includes said frame portion, said glass roof panel, and said lighting device, is installed at a vehicle, said forward region of said glass roof panel is at a headliner of the vehicle and above a windshield of the vehicle; and
   wherein said lighting device is configured to electrically connect to a power source of the vehicle via electrical connection at the headliner of the vehicle when said glass roof assembly is installed at the vehicle.

2. The glass roof assembly of claim 1, wherein the at least one interior light source comprises a task light operable to illuminate a driver or passenger seating area.

3. The glass roof assembly of claim 1, wherein the at least one interior light source comprises a courtesy light operable to illuminate the cabin of the vehicle.

4. The glass roof assembly of claim 1, wherein said frame portion includes side rail lights that are electrically connected to said lighting device and are operable responsive to another user input at said lighting device.

5. The glass roof assembly of claim 1, wherein said lighting device includes another user input operable, when said glass roof assembly is installed at the vehicle and with said lighting device electrically connected to at least one light source of the vehicle, to activate and deactivate the at least one light source of the vehicle.

6. The glass roof assembly of claim 1, wherein said glass roof assembly comprises a fixed glass roof panel and a movable glass panel that is movable between a closed position and an opened position, and wherein said lighting device is attached at said fixed glass roof panel.

7. The glass roof assembly of claim 1, wherein the headliner of the vehicle is formed with a recessed region and wherein, when said glass roof assembly is installed at the vehicle, said lighting device is disposed at the recessed region of the headliner of the vehicle.

8. The glass roof assembly of claim 1, wherein said lighting device is adhesively attached as a unit at the in-cabin surface of said glass roof panel.

9. The glass roof assembly of claim 1, wherein said user input comprises at least one touch sensor disposed behind at least one icon established at a touch surface of said lighting device.

10. The glass roof assembly of claim 9, wherein the at least one interior light source comprises at least one light emitting diode disposed behind a lens element of said lighting device, and wherein the at least one light emitting diode and the touch sensor are disposed on at least one printed circuit board of said lighting device.

11. The glass roof assembly of claim 10, wherein said lighting device comprises a cover that at least partially encases the at least one printed circuit board when said lighting device is attached at said in-cabin surface of said glass roof panel.

12. A method of assembling a glass roof assembly and installing the glass roof assembly at a vehicle, said method comprising:
   providing a frame portion;
   providing a glass roof panel;
   disposing the glass roof panel at the frame portion so that the glass roof panel is at least partially circumscribed by the frame portion;
   providing a lighting device comprising at least one interior light source and a user input for actuating the at least one interior light source;
   attaching the lighting device as a unit at an in-cabin surface of the glass roof panel at a forward region of the glass roof panel;
   after disposing the glass roof panel at the frame portion, and after attaching the lighting device as a unit at the in-cabin surface of the glass roof panel, installing the glass roof assembly at a vehicle, wherein the glass roof assembly comprises the frame portion, the glass roof panel and the lighting device;
   wherein, when the glass roof assembly is installed at a vehicle, the forward region of the glass roof panel is at a headliner of the vehicle and above a windshield of the vehicle; and
   electrically connecting the lighting device to a power source of the vehicle via electrical connection at the headliner of the vehicle when the glass roof assembly is installed at the vehicle.

13. The method of claim 12, wherein the at least one interior light source comprises a task light operable to illuminate a driver or passenger seating area.

14. The method of claim 12, wherein the at least one interior light source comprises a courtesy light operable to illuminate the cabin of the vehicle.

15. The method of claim 12, wherein the frame portion includes side rail lights, and wherein attaching the lighting device includes electrically connecting the lighting device to the side rail lights, and wherein the side rail lights are operable responsive to another user input at the lighting device.

16. The method of claim 12, wherein installing the glass roof assembly comprises electrically connecting the lighting device to at least one light source of the vehicle, and wherein the lighting device includes another user input operable, with the glass roof assembly installed at the vehicle, to activate and deactivate the at least one light source of the vehicle.

17. The method of claim 12, wherein the glass roof assembly comprises a fixed glass roof panel and a movable glass panel that is movable between a closed position and an opened position, and wherein attaching the lighting device as a unit at the in-cabin surface of the glass roof panel comprises attaching the lighting device at the fixed glass roof panel.

18. The method of claim 12, wherein the headliner of the vehicle is formed with a recessed region, and wherein, when the glass roof assembly is installed at the vehicle, the lighting device is disposed at the recessed region of the headliner of the vehicle.

19. The method of claim 12, wherein attaching the lighting device as a unit at the in-cabin surface of the glass roof panel comprises adhesively attaching the lighting device as a unit at the in-cabin surface of the glass roof panel.

20. The method of claim 12, wherein the user input comprises at least one touch sensor disposed behind at least one icon established at a touch surface of the lighting device, and wherein the at least one interior light source comprises at least one light emitting diode disposed behind a lens element of the lighting device, and wherein the at least one light emitting diode and the touch sensor are disposed on at least one printed circuit board of the lighting device, and wherein the lighting device comprises a cover that at least partially encases the at least one printed circuit board when the lighting device is attached at the in-cabin surface of the glass roof panel.

* * * * *